United States Patent
Hwang et al.

(10) Patent No.: US 10,074,153 B2
(45) Date of Patent: Sep. 11, 2018

(54) APPARATUS FOR PROCESSING IMAGE, COMPRISING MAIN MEMORY TO STORE APPLICATION AND SETTING INFORMATION

(71) Applicant: SAMSUNG ELECTRONICS CO., LTD., Suwon-si (KR)

(72) Inventors: Yo-seop Hwang, Yongin-si (KR); Seung-hoon Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 14/591,446

(22) Filed: Jan. 7, 2015

(65) Prior Publication Data
US 2015/0302547 A1    Oct. 22, 2015

(30) Foreign Application Priority Data
Apr. 21, 2014 (KR) .......................... 10-2014-0047400

(51) Int. Cl.
*G06F 3/06* (2006.01)
*G06T 1/60* (2006.01)

(52) U.S. Cl.
CPC .............. *G06T 1/60* (2013.01); *G06F 3/0604* (2013.01); *G06F 3/0655* (2013.01); *G06F 3/0683* (2013.01)

(58) Field of Classification Search
CPC .................................................... G06F 3/0604
USPC ......................................................... 345/531
See application file for complete search history.

(56) References Cited

U.S. PATENT DOCUMENTS

| | | | | |
|---|---|---|---|---|
| 7,120,806 B1* | 10/2006 | Codilian | ............... | G06F 1/3203 713/300 |
| 8,660,545 B1* | 2/2014 | Redford | ............... | H04W 4/001 348/552 |
| 2012/0144177 A1* | 6/2012 | Iyigun | ................... | G06F 9/4418 713/2 |
| 2015/0324287 A1* | 11/2015 | Priel | .................. | G06F 12/0897 711/118 |

* cited by examiner

*Primary Examiner* — Shivang Patel
(74) *Attorney, Agent, or Firm* — Sughrue Mion, PLLC

(57) ABSTRACT

An image processing apparatus may include a main memory configured to store an application for reproducing image content, and setting information corresponding to the stored application, a first ancillary memory configured to load and store the stored application from the main memory in response to operation of a signal processor, a second ancillary memory configured to, in response to the signal processor operating, temporarily store the signal-processed image content, and in response to the signal processor not operating, load and store the stored application from the main memory, and a controller configured to, in response to receiving an execution request with respect to the application for reproducing the image content, and the signal processor not operating, load and store the stored application from the main memory into the second ancillary memory based on the setting information corresponding to the application stored in the main memory, and execute the stored application.

26 Claims, 7 Drawing Sheets

APPARATUS FOR PROCESSING IMAGE, COMPRISING MAIN MEMORY TO STORE APPLICATION AND SETTING INFORMATION

CROSS-REFERENCE TO RELATED APPLICATION

This application claims priority under 35 U.S.C. § 119 from Korean Patent Application No. 10-2014-0047400, filed on Apr. 21, 2014 in the Korean Intellectual Property Office, the disclosure of which is incorporated herein by reference in its entirety.

BACKGROUND

1. Field

The present disclosure generally relates to an image processing apparatus, a method for processing an image, and a computer readable recording medium. More particularly, the present disclosure relates to an image processing apparatus which, when an apparatus dynamically uses a dedicated memory of hardware (HW), such as an MEPG 2 decoder and a Graphic Processing Unit (GPU) included in an image display apparatus like a TV, is capable of setting a storage route of an application based on setting information on an application necessary for processing an image content and process an application stored in the storage route expeditiously, a method for processing an image, and a computer readable recording medium.

2. Description of Related Art

In the related art, a product, such as a TV or a Blu-ray disc (BD) player, includes a dedicated memory which is used exclusively by HW. For example, a TV includes a memory which is used exclusively by an MPEG 2 decoder or a GPU, and a product like a BD player includes a memory which is used exclusively by HW. In the related art, the memory is used by only the HW, and thus, it is not possible for a system, that is, an operating system (OS), to use or access the memory.

In order to resolve such problem and improve cost competitiveness, a Hardware Dedicated Memory Allocator (HDMA) has been developed and used. The HDMA enables an OS to use a dedicated memory of HW in a TV or a BD player while the HW is not being operated. A HDMA technology enables the HW memory to be recognized as a contiguous memory of the HW. When it is determined that a HW memory is needed, HDMA is turned on. In this case, the OS adds the HW memory to a memory which is currently used for a current system, that is, a system memory. In conclusion, it can be seen that a capacity of a system memory increases. When the HDMA is turned off, the OS separates the HW memory from the system memory. Accordingly, the capacity of the system memory returns to an original status thereof. That is, the HW should not operate while the HDMA operates, and any leak of memory should not occur.

However, in the related art, data stored in a dedicated memory is backed up in a system, that is, an apparatus memory in response to the HDMA being turned off. This prolongs a turning-off time of the HDMA. That is, it takes a long time for the apparatus to return to the original status and operate. The time is proportional to a capacity of a system memory, and a capacity of a memory which is dynamically allocated while the HDMA is turned on.

SUMMARY

Exemplary embodiments of the present disclosure may overcome the above disadvantages and other disadvantages not described above. Also, the present disclosure is not required to overcome the disadvantages described above, and an exemplary embodiment of the present disclosure may not overcome any of the problems described above.

According to an aspect of an exemplary embodiment, an image processing apparatus is provided and may include a main memory configured to store an application for reproducing image content, and setting information corresponding to the stored application, a first ancillary memory configured to load and store the stored application from the main memory in response to operation of a signal processor for signal-processing the image content and display the signal-processed image content on a screen, a second ancillary memory configured to, in response to the signal processor operating, temporarily store the signal-processed image content, and in response to the signal processor not operating, load and store the stored application from the main memory, and a controller configured to, in response to receiving an execution request with respect to the application for reproducing the image content, and the signal processor not operating, load and store the stored application from the main memory into the second ancillary memory based on the setting information corresponding to the application stored in the main memory, and execute the stored application.

The apparatus may include a signal processor configured to decode and signal-process the image content and output the decoded image content so as to be displayed on a screen, and an operating status sensor configured to sense an operating status of the signal processor, wherein the controller may determine an operational state of the signal processor based on a sensed result.

The apparatus may be configured so that in response to non-existence of setting information on the application stored in the main memory, the controller may load and store the application stored in the main memory into the first ancillary memory, and wherein in response to existence of the setting information, the controller may load and store the application stored in the main memory into the second ancillary memory.

The controller may be further configured to delete the application stored in the second ancillary memory in response to the signal processor operating again.

The setting information may include attribute information and type information corresponding to the application, and in response to the signal processor operating again, the controller may back up the application from the second ancillary memory to the first ancillary memory based on the type information.

The first ancillary memory may further store priority information corresponding to the application, and the controller may perform a back-up operation based on the priority information in response to a storage space of the first ancillary memory being insufficient for backing up the application.

The attribute information may include information related to a type of application necessary for reproducing the image content, and the type information may include a process and a thread which are specific operations of the application.

The apparatus may further include a graphic user interface (GUI) generating unit configured to generate a user interface (UI) graphic to which a user inputs the setting information, and the controller may control the GUI generating unit to display the UI graphic on a screen in response to a user request being received.

The first ancillary memory and the second ancillary memory may be physically separated from each other.

According to another aspect of an exemplary embodiment, an image processing method may include storing an application for reproducing image content and storing setting information corresponding to the stored application in a main memory, loading and storing the stored application from the main memory into a first ancillary memory in response to operation of a signal processor for signal-processing the image content and displaying the signal-processed image content on a screen, temporarily storing, in response to the signal processor operating, the signal-processed image content into a second ancillary memory, and in response to the signal processor not being driven, loading and storing the stored application from the main memory into the second ancillary memory, and loading and storing, in response to receiving an execution request with respect to the application for reproducing the image content and the signal processor not operating, the stored application from the main memory into the second ancillary memory based on the setting information on the application stored in the main memory, and executing the stored application.

The method may include decoding and signal-processing the image content, outputting the decoded image content so as to be displayed on a screen, and sensing an operating status of the signal processor, wherein a controller may determine the operating status of the signal processor based on a sensed result.

The method may include loading and storing the application stored in the main memory into the first ancillary memory in response to non-existence of setting information corresponding to the stored application, and loading and storing the application stored in the main memory into the second ancillary memory in response to existence of the setting information corresponding to the stored application.

The method may include deleting the application stored in the second ancillary memory in response to the signal processor operating again.

The setting information may include attribute information and type information corresponding to the application, and the executing may include backing the application up from the second ancillary memory to the first ancillary memory based on the type information in response to the signal processor operating again.

The first ancillary memory further may store priority information corresponding to the application, and the executing may include performing a back-up operation based on the priority information in response to a storage space of the first ancillary memory being insufficient for backing the application up.

The attribute information may include information related to a type of an application which is necessary for reproducing the image content, and the type information may include a process and a thread which are specific operations of the application.

The method may include generating a user interface (UI) graphic to which a user may input the setting information, and the executing may include controlling to display the UI graphic on the screen in response to a user request being received.

According to another aspect of an exemplary embodiment, a method for processing an image may include determining whether an execution request with respect to an application for processing an arbitrary image content is received, determining, in response to the execution request being received, an operating status of a signal processor for signal-processing the image content and displaying the signal-processed image content on a screen, and loading and storing, in response to the signal processor not operating, the application to an ancillary memory which is connected to the signal processor and used exclusively based on setting information on the application stored into a main memory.

The method may include loading and storing the application into the ancillary memory in response to existence of the setting information.

The method may further include determining whether the signal processor operates again, and deleting the application stored in the ancillary memory in response to the signal processor operating again.

The method may include determining whether the signal processor operates again, and performing a back-up operation by determining whether to back the application up to the ancillary memory which operates with a controller, based on the setting information in response to the signal processor operating again.

The loading and storing of the application into the ancillary memory may be performed based on attribute information included in the setting information, and wherein the performing the back-up operation is performed based on type information included in the setting information.

The attribute information may include information on a type of application necessary for reproducing the image content, and the type information may include a process and a thread which are specific operations of the application.

The performing the back-up operation may include performing a back-up operation based on priority information included in the setting operation in response to a storage space of the first ancillary memory being insufficient for backing the application up.

According to another aspect of an exemplary embodiment a non-transitory computer readable recording medium may be provided and include a program for executing a method for processing an image, the method including determining whether an execution request with respect to an application for processing an arbitrary image content is received, determining, in response to the execution request being received, an operating status of a signal processor for signal-processing the image content and displaying the signal-processed image content on a screen, and loading and storing, in response to the signal processor not operating, the application to an ancillary memory which is connected to the signal processor and used exclusively based on setting information on the application stored into a main memory.

According to another aspect of an exemplary embodiment, an electronic apparatus may include a first ancillary memory, a second ancillary memory, a hardware device, and a controller, the controller may be configured to detect an operational state of the hardware device, and in response to the hardware device being in an operational state, allocate the first ancillary memory to the controller and second ancillary memory to the hardware device, and in response to the hardware device being in a non-operational state, allocate the first ancillary memory and the second ancillary memory to the controller.

The controller may be configured to copy content from the second ancillary memory to the first ancillary memory in response to the hardware device transitioning from a non-operational state to an operational state.

The controller may be configured to determine a priority of the content from the second ancillary memory, and copy the content to the first ancillary memory based on the priority of the content.

BRIEF DESCRIPTION OF THE DRAWINGS

The above and/or other aspects of the present disclosure will become apparent and more readily appreciated by describing certain exemplary embodiments with reference to the accompanying drawings, in which.

DETAILED DESCRIPTION OF EXEMPLARY EMBODIMENTS

Figure 1:
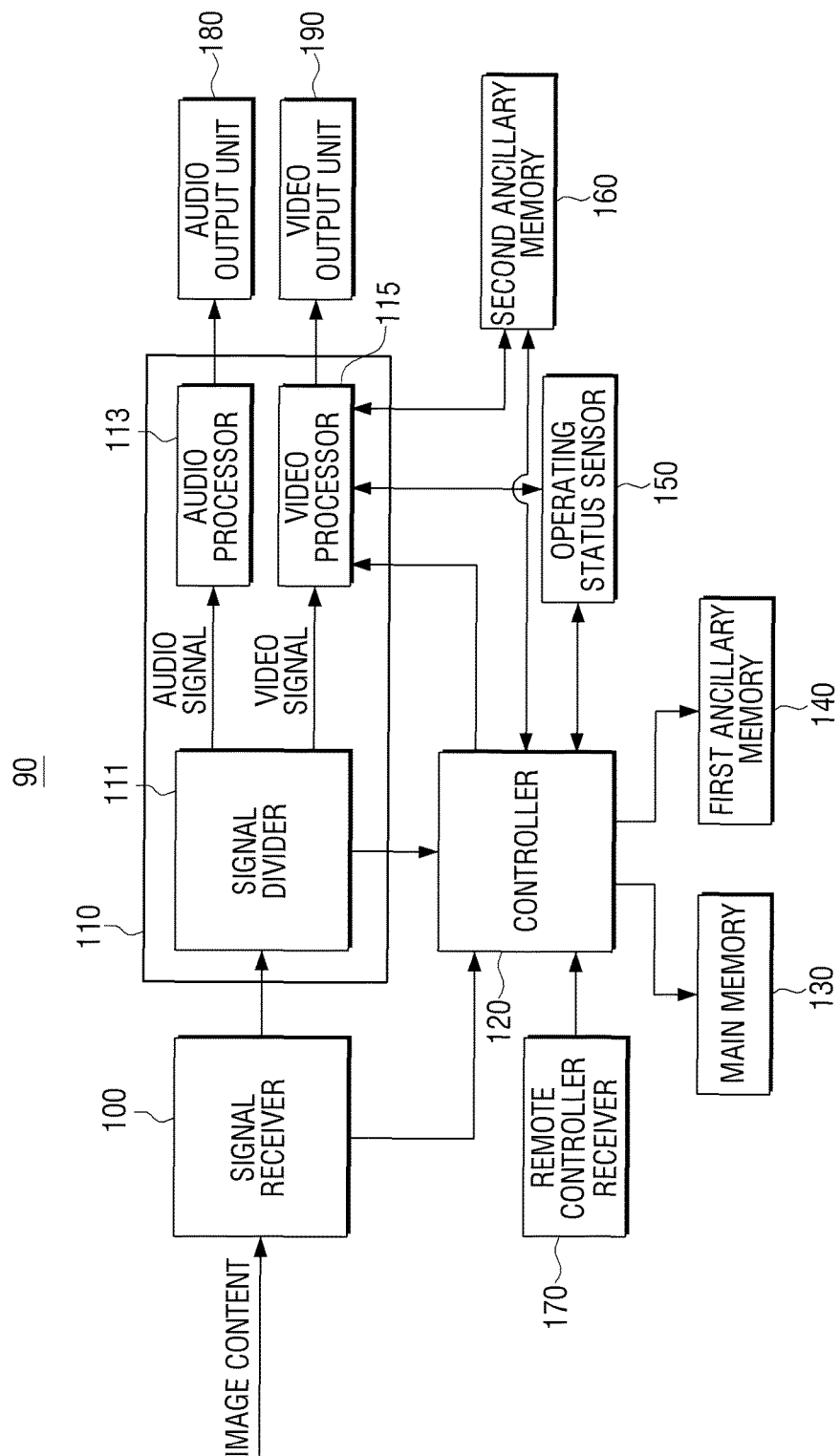
FIG. 1 is a block diagram illustrating a structure of an image processing apparatus according to an exemplary embodiment.

Hereinafter, terms that are used in the specification will be briefly described, and exemplary embodiments will be described in detail. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

One or more exemplary embodiments of the present disclosure will now be described more fully with reference to the accompanying drawings. However, the one or more exemplary embodiments of the present disclosure may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments of the present disclosure to those of ordinary skill in the art. In the following description, well-known functions or constructions are not described in detail since they would obscure the one or more exemplary embodiments of the present disclosure with unnecessary detail. Like reference numerals in the drawings denote like or similar elements throughout the specification.

Figure 2:
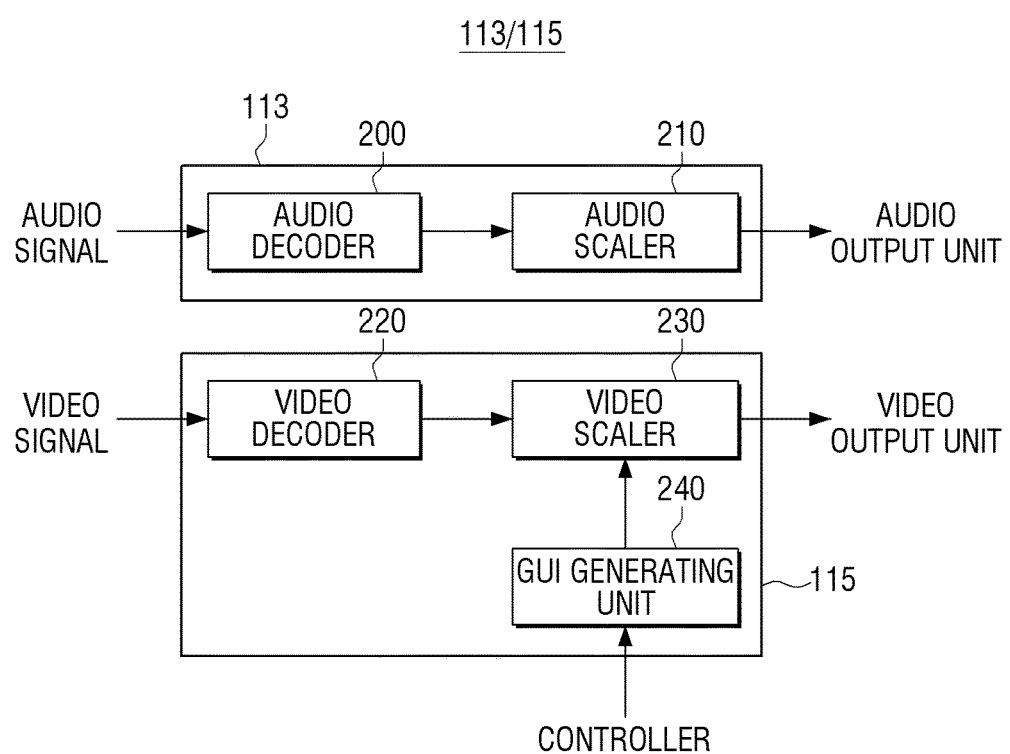
FIG. 2 is a block diagram exemplifying a specific structure of an audio processor and a video processor.

FIG. 1 is a block diagram illustrating a structure of an image processing apparatus according to an exemplary embodiment, and FIG. 2 is a block diagram exemplifying a specific structure of an audio processor and a video processor of FIG. 1.

Referring to FIGS. 1 and 2, an image processing apparatus 90 according to an exemplary embodiment may include a part or all of a signal receiver 100, a signal processor 110, a controller 120, a main memory 130, a first ancillary (or auxiliary) memory 140, an operating status sensor 150, a second ancillary memory 160, a remote controller receiver 170, an audio output unit 180, and a video output unit 190.

For example, the remote controller receiver 170, may be omitted, or the operating status sensor 150 may be integrated with another component such as the controller 120. Herein, for better understanding the image processing apparatus 90 is described as including all of the components.

The signal receiver 100 may receive image content and an application (or a program) necessary for reproducing the image content. In this case, the image content may be provided from a broadcasting station, a physical medium or an external server. For example, in response to the image processing apparatus 90 being a BD player, the signal receiver 100 may receive a content stored in a BD. In addition, the signal receiver 100 may receive an application necessary for reproducing the image content. For example, if an operating system such as Linux is installed, the signal receiver 100 may receive an application for executing or reproducing content, such as Explorer, a web browser, a video player, a media viewer, view, etc. Such application may be provided from an external server. Thus, in the present exemplary embodiment, the source of an application is not limited. That is, an internal application, or an application downloaded from an external source may be used.

The signal receiver 100 may receive image content via a broadcasting signal transmitted from a broadcasting station. In this case, the image content may be carried on a radio frequency (RF) signal. In response to the image content being provided by an external server or a player, the image content may be in a form of a High Definition Multimedia Interface (HDMI) signal. The HDMI signal requires only a scaling operation for adjusting resolution. Thus, the HDMI signal is different from an RF signal which requires an operation such as decoding.

The signal receiver 100 may include a tuner and a demodulator for processing a broadcasting signal. The tuner may tune and receive a broadcasting signal of a particular channel that a user wants from among received broadcasting signals. The demodulator may reconstruct a modulated broadcasting signal to reproduce an original signal. The signal receiver 100 may include an HDMI receiver so as to be able to receive an image content in a form of an HDMI signal, for example.

The signal receiver 100 may process image content. Further, the signal receiver 100 may process an application. The signal processor 110 may include a signal divider 111, an audio processor 113, and a video processor 115. For example, when image content is received in the form of a broadcasting signal, the signal divider 111 may divide the broadcasting signal into a video signal, an audio signal, and additional information. The divided additional information may be provided to the controller 120. The additional information may be Program and System Information Protocol (PSIP) information. The additional information may include an application for reproducing a particular video signal or information such as subtitles.

The audio processor 113 may receive an audio signal divided by the signal divider 111, decode the received audio signal, and post-process the decoded audio signal. The audio processor 113 may perform a post-processing operation such as noise removal, etc. For performing this operation, as shown in FIG. 2, the audio processor 113 may include an audio decoder 200 configured to decode an audio signal, and an audio scaler 210 configured to post-process the decoded audio signal.

The video processor 115 may receive a video signal divided by the signal divider 111. Subsequently, the video processor 115 may decode the received video signal and perform a scaling operation, including the resolution adjustment, with respect to the decoded video signal. For performing these operations, as shown in FIG. 2, the video processor 115 may include a video decoder 220 configured to decode a video signal, and a video scaler 230 configured to scale the decoded video signal. In this process, for example, in response to receiving a user command to display a UI graphic, the video processor 115 may mix and output the UI graphic with a video signal according to the user command. In this regard, the video processor 115 may further include a mixer (not shown) configured to communicate with a GUI generating unit 240 and the video scaler 230. The UI graphic may be an additional screen where a user sets (or registers) information with respect to an application for reproducing image content.

Although not shown in the drawings, the video processor 115 may include a processor. The video processor 115 may communicate with the operating status sensor 150 through the processor. When it is determined that a video signal to be processed does not exist, the video processor 115 may notify a result of the determination to the operating status sensor 150. In exemplary embodiments where the processor of the video processor 115 includes the operating status sensor 150, the result of the determination may be directly notified to the controller 120.

The controller 120 may control overall operation of internal components constituting the image processing apparatus 90, such as the signal receiver 100, the signal process 110, etc. The image processing apparatus may be a set-top box, a TV, a BD player, or the like. For example, in response to image content being received via a broadcasting signal, the controller 120 may store additional information divided by the signal divider 111 in the main memory 130 or the first ancillary memory 140. Subsequently, the controller 120 may read the additional information stored in the first ancillary memory 140, and provide the additional information to the video processor 115 so that the additional information may be combined and outputted with the decoded and scaled video signal.

When an application stored in the main memory 130 needs to be executed according to a user request, the controller 120 may load (or allocate) and store the application into one of the first ancillary memory 140 and the second ancillary memory 160, and execute the stored application. For example, in response to determining that the video processor 115 does not operate based on a sensed result received from the operating status sensor 150, such as an HDMA, the controller 120 may load and store the application into the second ancillary memory 160 based on setting information that is set by a user.

A user is able to configure the setting information through the UI graphic displayed on a screen. The setting information may include an attribute and a type of application. A particular application corresponding to the setting information set by the user may be loaded and stored into the second ancillary memory 160. If the setting information does not exist, the application may be stored in the first ancillary memory 140. The attribute information may represent whether the application is related to Explorer, the web browser, or another application. The type information may represent several types of attributes or specific information of the application, for example, a process or a thread.

Further, in response to determining that the video process 115 operate again, or the operating status sensor 150 is turned off based on the sensed result received from the operating status sensor 150, the controller 120 may determine whether to back up the application stored in the second ancillary memory 160, or process data related to the application based on the setting information stored in the main memory 130. For example, in response to a determining that a back-up operation is necessary, a back-up operation may be performed. Otherwise, the application stored in the second ancillary memory 160 may be deleted. In addition, in response to determining that insufficient storage space exists for the back-up operation of the first ancillary memory 140, the controller 120 may first back up an application having high priority and then sequentially back up the other applications based on priority information stored in the main memory 130. In this case, data having low priority may be deleted. Although it was described that the setting information is stored in the main memory 130, the setting information may be stored in the first ancillary memory 140 which belongs to a system memory of the controller 120.

The controller 120 may perform a control operation of controlling the image processing apparatus 90 according to a signal related to a user command provided by remote controller receiver 170. The remote controller receiver 170 receives a signal provided from a remote controller in order to perform an operation corresponding to the user command.

As described above, the main memory 130 may operate as a dedicated memory of the controller 120 and may include the OS, such as Linux. In substance, the main memory 130 is a memory, like a hard disk, which may keep data permanently. The main memory 130 may store applications for executing an OS program, or a program for executing a particular operation, such as web browser, Explorer, etc. In addition, the main memory 130 may store the additional information divided by the signal divider 111. The main memory 130 may store the setting information that a user set through the UI graphic. The setting information may include various types of information, such as attribute information, type information, back-up information, priority information, etc.

The first ancillary memory 140 may be included in a range of the dedicated memory of the controller 120. Comparing the first ancillary memory 140 with the main memory 130, the first ancillary memory 140 may be a flash memory which temporarily stores data. In response to a web browser operation being performed according to a user request, an application related to the web browser from the main memory 130 may be loaded and stored into the first ancillary memory 140. The application may be stored in the first ancillary memory 140 when it is determined, based on the sensed result of the operating status sensor 150, that the video processor 115 is in operation. If the video processor 115 is not in operation, the application may be stored in the first ancillary memory 140 when there is no setting information representing a user intention that the user will load and store the application into the second ancillary memory 160. Further, the first ancillary memory 140 may temporarily store various information or data processed by the controller 120.

The operating status sensor 150 may include a memory allocator, for example, an HDMA. The operating status sensor 150 may store an application (or a program) for a sensing operation, and perform an operation with the video processor 115 by executing the application. For example, in response to determining that there is no image signal processed by the video processor 115, that is, in response to determining that there is no image content based on information provided from the processor of the video processor 115, the operating status sensor 150 may provide a sensed result to the controller 120. Accordingly, the controller 120 may determine whether to allocate, that is, use the first ancillary memory 140.

The second ancillary memory 160 may be used as a dedicated memory of the signal processor 110. More specifically, the second ancillary memory 160 may be used as a dedicated memory of the video processor 115 in response to the video processor 115 operating. The operating status sensor 150 may indicate whether the video processor 115 is operating or not. The second ancillary memory 160 may temporarily store a video signal processed by the video processor 115. In response to determining that there is no video signal processed by the video processor 115, the second ancillary memory 160 may store, for example, an application or process data related to the application requested by a user, under control of the controller 120. The image content or related data may be stored according to the user setting information. For example, content or data having low importance may be stored. In response to the video processor 115 operating again, the controller 120 may delete, for example, data stored in the second ancillary memory 160, or back up only important parts of applications or data. Accordingly, the controller 120 may reduce a return time required to operate an apparatus again.

The remote controller receiver 170 may communicate with a remote controller, and in response to a user control command being received, transmit the received control command to the controller 120.

The audio processor 180 may be a connecter that outputs an audio signal processed by the audio processor 113. The audio processor 180 may include a speaker for outputting an audio signal.

The video processor 190 may be a connecter that outputs a video signal processed by the video processor 115. The video processor 190 may include a panel for outputting a video signal on a screen.

Figure 3:
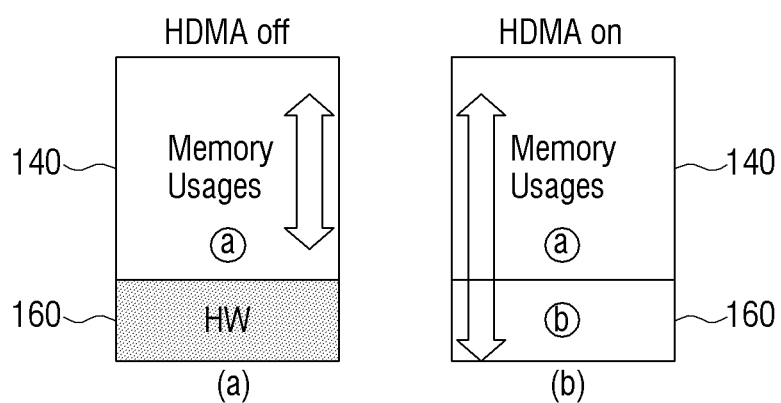
FIG. 3 is a diagram provided to describe an exemplary operating process of an operating status sensor.

FIG. 3 is a diagram illustrating an operating process of the operating status sensor of FIG. 1.

Referring to FIG. 3, the second ancillary memory 160 may be used as a dedicated memory of the video processor 115 in response to the operating status sensor 150 of FIG. 1 being turned off, as shown in (a). In addition, as shown in (b), in response to the operating status sensor 150 being turned on, the first ancillary memory 140 and the second ancillary memory 160 may be used as a memory of the controller 120 that executes the OS.

Referring to FIG. 3 in further detail, as shown in (b), the amount of memory that the controller 120 may use has increased by an amount of memory usage allocated to the video processor 115. If the operating status sensor 150 is turned off in this process, the memory returns to the status illustrated in (a). That is, the memory that the controller 120 may use decreases by the amount of the memory allocated to the video processor 115.

In response to determining that a memory from among memories which are dynamically allocated while the operating status sensor 150 is turned off is not necessary, the memory may be excluded when an application is executed. That is, if a plurality of dedicated memories, such as the second ancillary memory 160, are included in an apparatus, or, for example, if a decoder or a GPU includes a memory, only a part of the plurality of memories may be used as an allocated memory.

In case the application or the related data stored in the second ancillary memory 160 needs to be maintained continuously, the controller 120 may back up the data stored in the second ancillary memory 160 into the first ancillary memory 140.

When the memory that the controller 120 uses is large, or if there are several memories which were dynamically allocated in a turning-on status of the operating status sensor 150, and the memories need to be managed and maintained continuously, a back-up operation from the second ancillary memory 160 to the first ancillary memory 140 in a turning-off status of the operation status sensor 150 may require a relatively large amount of time. Specifically, in response to no memory being available, that is, in response to no space being available in the first ancillary memory 140, an operation for securing available memory, may be included in a turning-off time of the operating status sensor 150, that is, the HDMA. The operation may be, for example, page swapping, etc.

Thus, according to an aspect of an exemplary embodiment, only the memories allocated by an application which was previously registered, or by a process or a thread of the application, are allocated to the second ancillary memory 160. The memories allocated by an application which was not previously registered, or a process or a thread of the application, are allocated to the first ancillary memory 140. Accordingly, it is possible to reduce a size of data to be backed up in the turning-off status of the operating status sensor 150. A return time of an apparatus may also be decreased.

Figure 4:
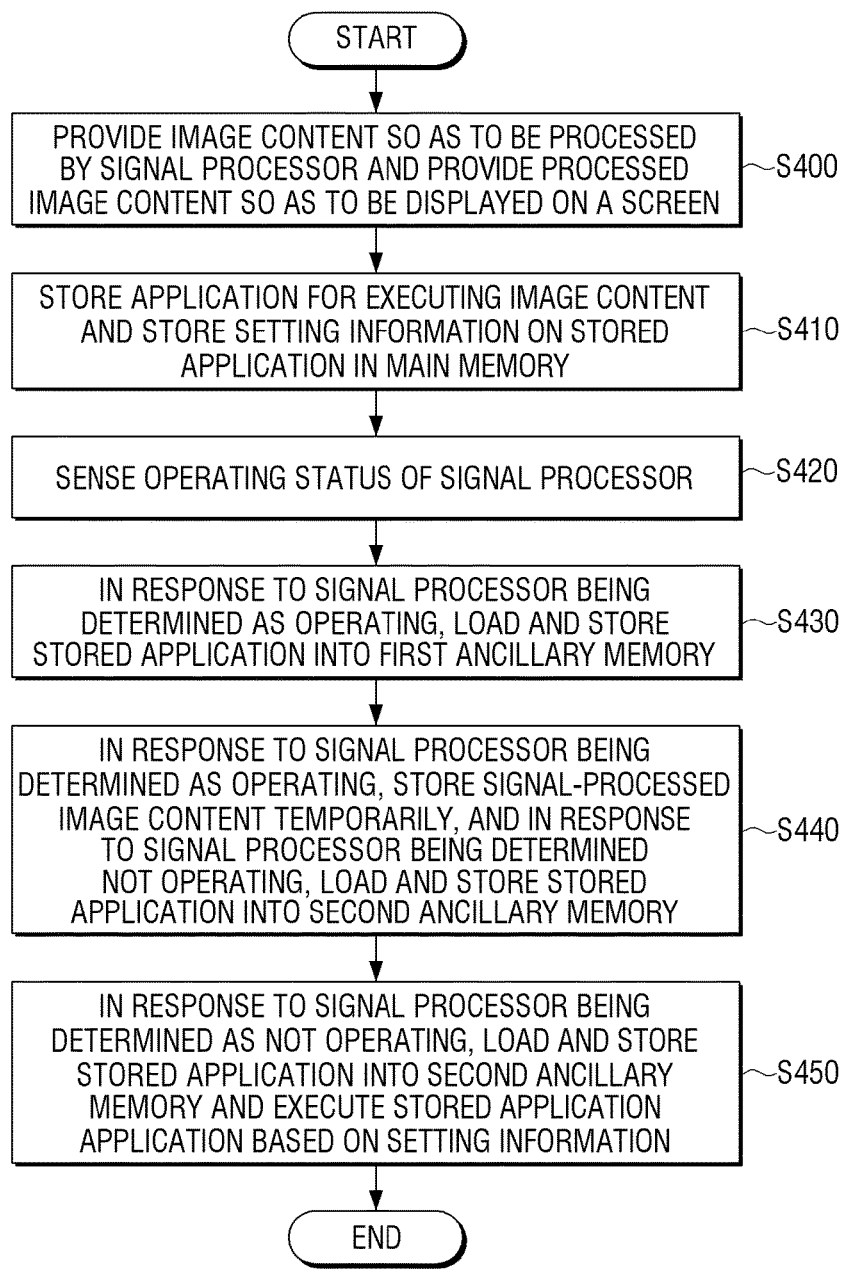
FIG. 4 is a flowchart illustrating an exemplary method for processing an image.

FIG. 4 is a flowchart provided to describe a method for processing an image according to the first exemplary embodiment.

Referring to FIG. 4, the image processing apparatus 90 according to an exemplary embodiment, may provide an inputted image content to be processed by the signal processor 110, and may provide the processed image content to be displayed on a screen (S400). In this process, the image processing apparatus 90 may be provided with an application necessary for reproducing (or processing) the image content. The application may include an application which performs a function such as that of Explorer, and may be included in an OS in initial installation of the OS. The image content may be a broadcasting signal provided by a broadcasting station, or an image signal provided by a server.

The image processing apparatus 90 may store an application for reproducing the image content, and may store setting information corresponding to the stored application in the main memory 130 (S410). The setting information may be stored in the first ancillary memory 140. The setting information may include attribute information related to an application for executing the web browser, type information that represents a type of the attribute information, priority information for determining a priority order of a back-up operation, etc.

The image processing apparatus 90 may sense an operating status of the signal processor 110 (S420). Above, with reference to FIG. 1, it was described that the image processing apparatus 90 may sense a status of the video processor 115, but according to the exemplary embodiments, the image processing apparatus 90 may sense a status of various function blocks constituting the signal processor 110. The function blocks may include various blocks, such as a GPU. In this case, it is desirable that each of the function blocks has a dedicated memory, such as the second ancillary memory 160.

In response to a user execution command being received when the signal processor 110 operates, the image processing apparatus 90 may load and store the application stored in the main memory 130 into the first ancillary memory 140 (S430). If the setting information does not exist, the application stored in the main memory 130 may be loaded and stored into the first ancillary memory 140 even though the signal processor 110 is not operating. Subsequently, the image processing apparatus 90 may temporarily store the signal-processed image content in response to determining that the signal processor 110 operates. In response to determining that the signal processor 110 does not operate, the image processing apparatus 90 may load and store the application stored in the main memory into the second ancillary memory 160 (S440). In this case, the loading and storing operations into the second ancillary memory 160 may be performed based on the setting information.

In response to determining that the signal processor 110 does not operate, the image processing apparatus 90 may load and store the application stored in the main memory 130 into the second ancillary memory 160, and execute the stored application based on the setting information (S450).

For example, in an OS such as Linux, an application to use a hardware-dedicated memory may be determined in advance from among applications necessary for executing the web browser. A process or a thread of the application may be registered during a booting process. For example, each application may be registered by using a system call of Linux kernel such as ioctl or /proc. That is, in order to allocate a memory, a process or a thread may be registered in advance through an interface provided by the OS. Accordingly, the OS may process the previously registered process or thread separately from a process or a thread that is not registered. According to an aspect of an exemplary embodiment, such registration process may be determined by a user through a UI graphic displayed on a screen.

In response to memory allocation being requested by a particular process or thread while the operating status sensor 150, such as the HDMA, is turned on, the OS may determine whether the process or thread was registered previously. In response to determining that the process or thread has been previously registered, the OS may allocate the process or thread to the second ancillary memory 160. Otherwise, the OS may allocate the process or thread to the first ancillary memory 140. The number of objects to be backed up when the HDMA is turned off, that is, the amount of data, may be reduced, thereby reducing a turning-off time of a HDMA.

In response to determining that the signal processor 110 operates again, that is, in response to determining that the operating status sensor 150 is turned off, the image processing apparatus 90 may delete the data stored in the second ancillary memory 160, or back up the data into the first ancillary memory 140. The related description will be provided below with reference to FIGS. 5 and 6.

Figure 5:
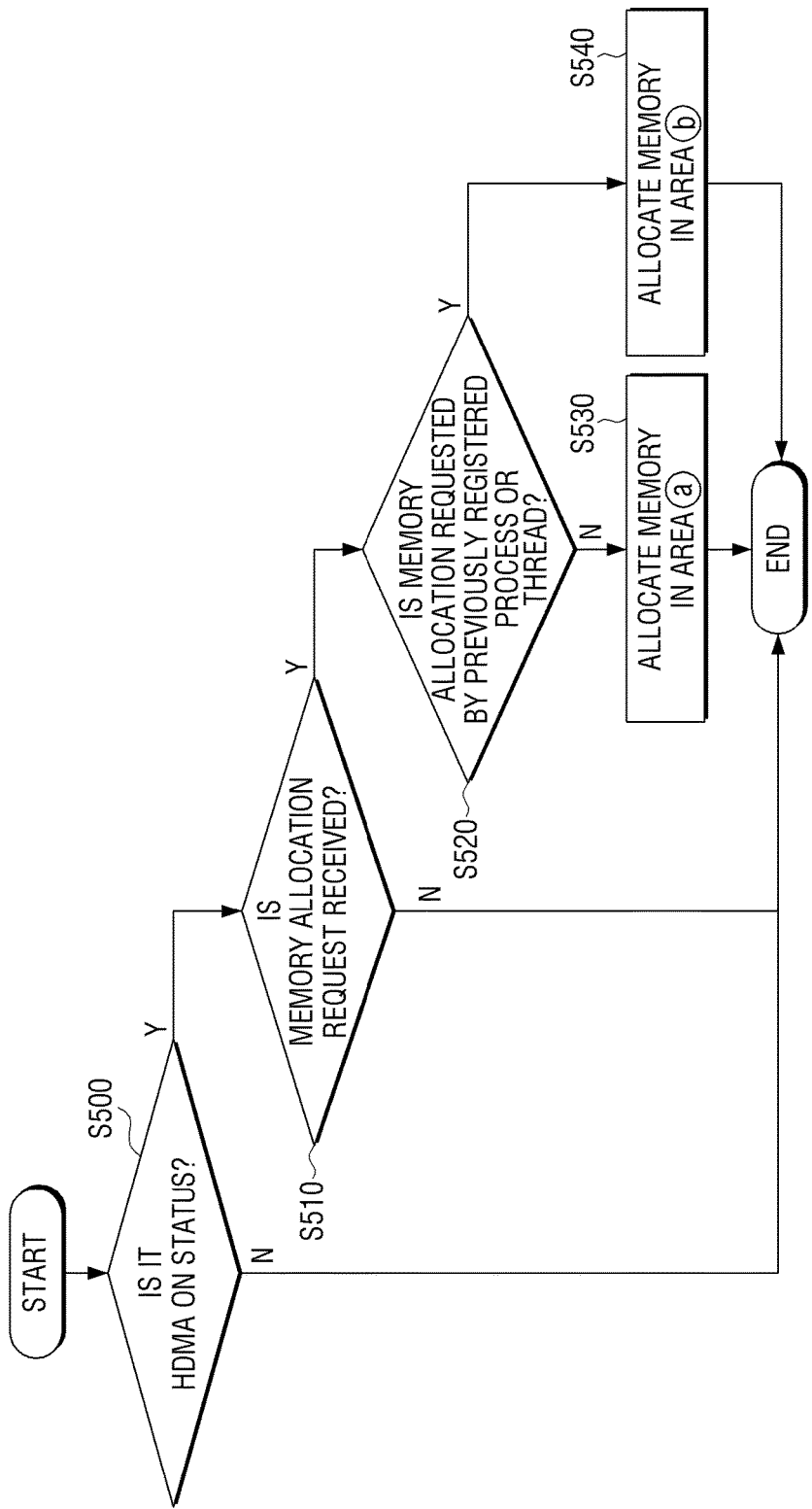
FIG. 5 a flowchart illustrating an exemplary method for processing an image.

FIG. 5 a flowchart provided to describe a method for processing an image according to the second exemplary embodiment.

Referring to FIG. 5, the image processing apparatus 90 may determine whether the operating status sensor 150, which may operate as an HDMA, for example, is turned on (S500). This operation may be performed based on a sensed result provided from the operating status sensor 150. That is, the sensed result may be a binary number '1' in response to the operating status sensor 150 being turned on, and in response to the operating status sensor 150 being turned off, the sensed result may be a binary number '0.'

In response to determining that the operating status sensor 150 is turned off, a current status, that is, a signal processing status may be maintained. In response to determining that the operating status sensor 150 is turned on, the image processing apparatus 90 may determine whether a memory allocation request is received (S510). That is, availability of the second ancillary memory 160 may be determined. In this case, the memory allocation request may be determined based on the attribute information of the application. The attribute information may represent whether the application is related to Explorer, the web browser, or a video media.

In the case of an application without an allocation request, that is, an application which does not have previously registered attribute information, the image forming apparatus 90 may ignore processing with respect to the application.

In the case of an application with an allocation request, that is, an application which has previously registered attribute information, the image forming apparatus 90 may further determine whether the application is an application having the type information set by a user (S520).

In response to determining that the application is not an application of previously registered type, that is, in response to determining that the application is not an application of a process or a thread, the image processing apparatus 90 may allocate and store process data of the application only into area ⓐ of FIG. 3, that is, into a first memory 130 (S530).

In response to determining that the application is an application of a previously registered type, the image processing apparatus 90 may allocate and store the process data of the application into area ⓑ of FIG. 3, that is, into a second memory 150 (S540).

Figure 6:
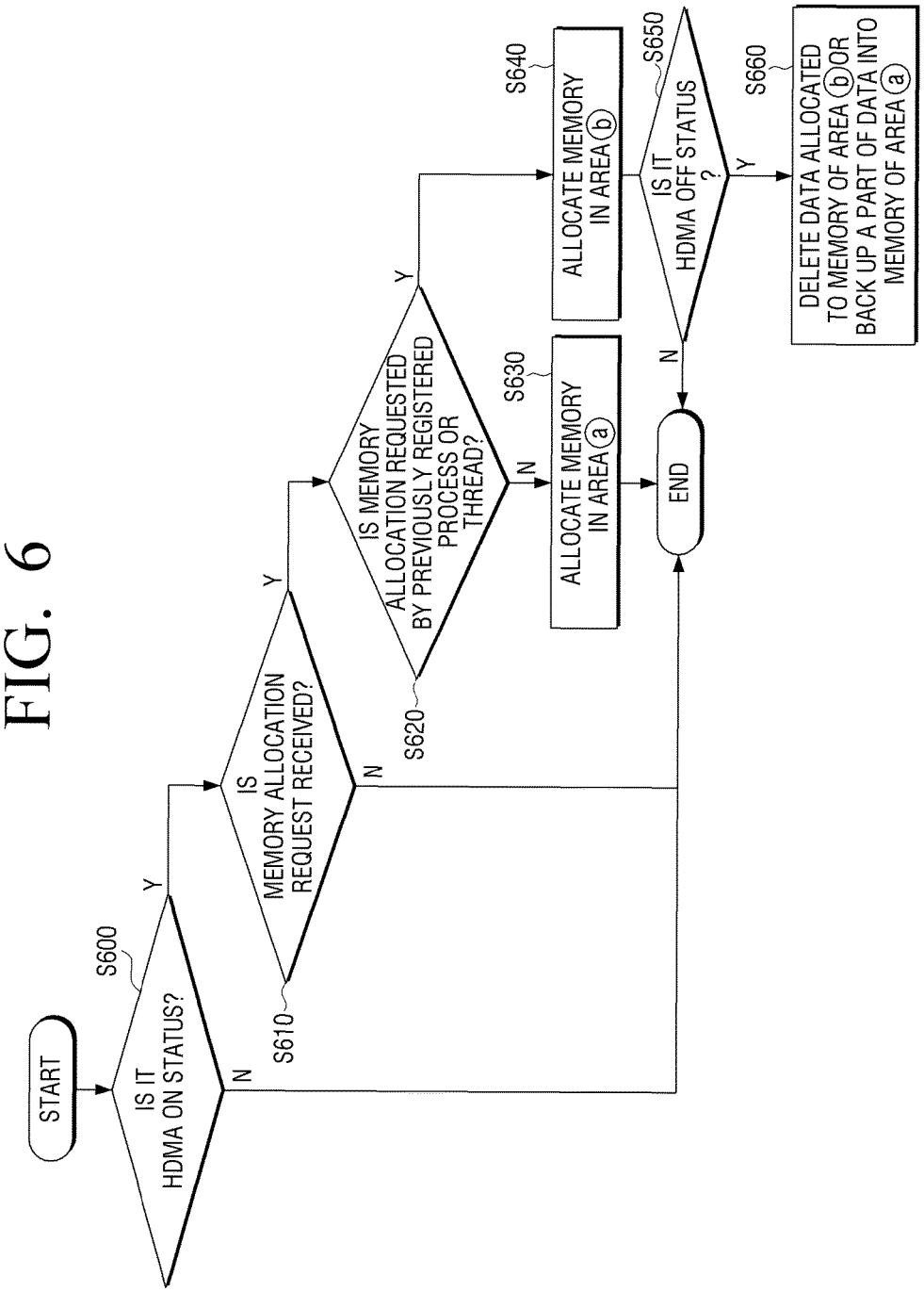
FIG. 6 a flowchart illustrating an exemplary method for processing an image.

FIG. 6 a flowchart provided to describe a method for processing an image according to the third exemplary embodiment.

Referring to FIG. 6, the processes from S600 to S640 are performed in the same manner as in the processes of S500 to S540 described in connection with FIG. 5. Thus, the detailed description will be omitted.

In the method for processing an image according to as aspect of an exemplary embodiment, the image processing apparatus 90 may determine whether the operating status sensor 150, such as the HDMA, is turned off after the allocation and storing operations with respect to the second ancillary memory 160 are performed (S650). That is, it signifies that there is data which is signal-processed by the signal processor 110 of FIG. 1.

In response to determining that the operating status sensor 150 is turned off, the image processing apparatus 90 may delete the data stored in the second ancillary memory 160 unconditionally, or delete the data based on the setting information stored in the first ancillary memory 140, or back up a part of the data to the first ancillary memory 140 (S660).

According to the exemplary embodiment, the image processing apparatus 90 may allocate and store data having low importance to the second ancillary memory 160. Thus, it may be desirable to back up a part of the data to the first ancillary memory 140. In response to determining that the data requires back-up, based on the setting information stored in the main memory 130 or the first ancillary memory 140, the image processing apparatus 90 may perform a back-up operation. In response to insufficient space available in the first ancillary memory 140, the image processing apparatus 90 may first back up data having higher importance based on the priority information included in the additional setting information. For example, if it is impossible to back-up of the data having low importance, even based on the priority order, the data may be deleted.

Figure 7:
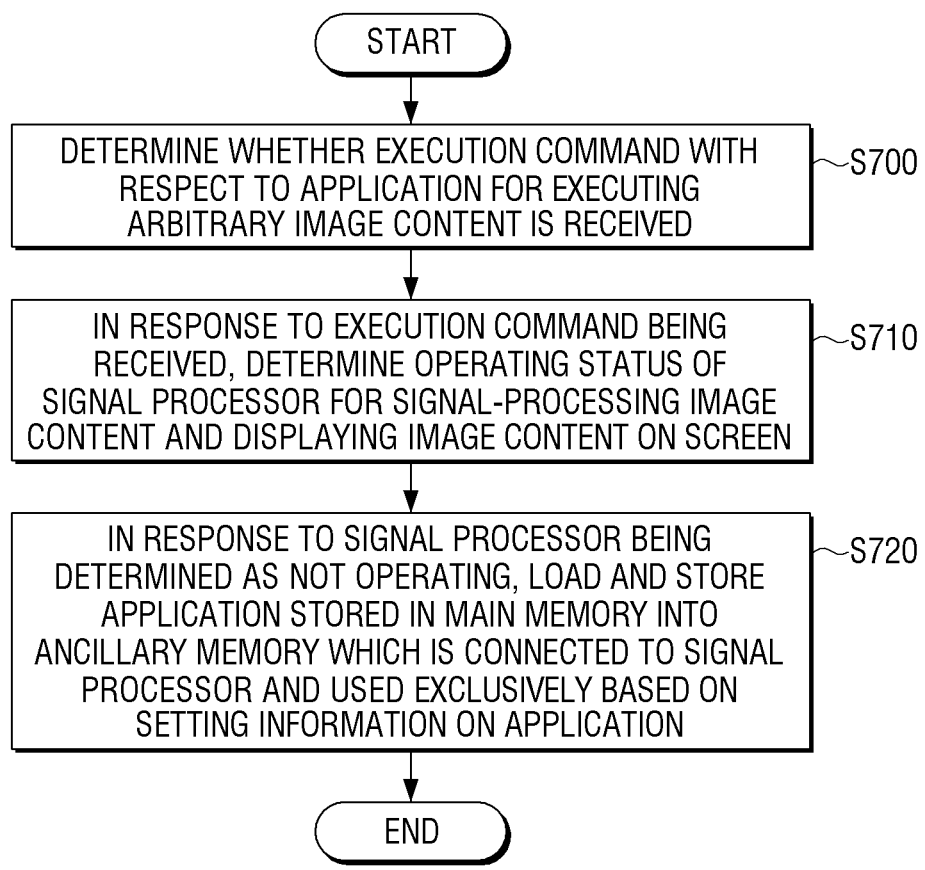
FIG. 7 a flowchart illustrating an exemplary method for processing an image.

FIG. 7 a flowchart provided to describe a method for processing an image according to the fourth exemplary embodiment.

The method of processing an image of FIG. 7 is based on the operating status sensor 150 being integrated with the controller 120, in view of FIG. 1 according to an aspect of an exemplary embodiment.

The image processing apparatus 90 according to the exemplary embodiment, more specifically, the controller 120 may determine whether an execution command with respect to an application for processing an arbitrary image content is received (S700). For example, the controller 120 may determine whether a user executes a web browser or executes video media.

In response to the execution command being received, the image processing apparatus 90 may determine an operating status of the signal processor 110 for signal-processing an image content. For example, for decoding and scaling the image content (S710). The image processing apparatus 90 may determine the operating status of the signal processor 110 by receiving information representing that the signal processor 110 is in operation, from the signal processor 110. Meanwhile, the operating status may also be determined by other various methods.

In response to determining that the signal processor 110 is not operating, the image processing apparatus 90 may load and store an application stored in the main memory 130 into the ancillary memory. The ancillary memory may be connected to the signal processor 110 and used exclusively, that is, into the second ancillary memory 160 based on the setting information on the application stored in the main memory 130 or the second ancillary memory 160 as shown in FIG. 1 (S720).

In this process, the controller 120 may perform various additional operations. As described above in connection with FIGS. 4-6, if the setting information does not exist, the controller 120 may load and store the application into the first ancillary memory 140 and delete or back up the application or the related data after storing the application or the related data in the second ancillary memory 160.

All of the components constituting the exemplary embodiments may be combined into a single component, or operate by being combined with each other, but arrangements are not limited thereto. That is, of the exemplary embodiments discussed above, the components may be selectively combined and operate as one or more components. In addition, the components may be implemented as separate hardware components, or a part or all of the components may be selectively combined and implemented as a computer program having a program module configured to perform a part or all functions combined in one or more pieces of hardware. Codes and code segments constituting the computer program may be easily derived by a person having ordinary skill in the art. Such computer program may be stored in a non-transitory computer readable recording medium which is readable by a computer and may be read by a computer.

The non-transitory computer readable recording medium refers to a medium which may store data semi-permanently and may be readable by an apparatus. Specifically, the above-described various applications and programs may be stored in the non-transitory computer readable recording medium like a compact disc (CD), a digital versatile disk (DVD), a hard disk, a Blu-ray disk, a universal serial bus (USB), a memory card, and a read-only memory (ROM), etc., and provided therein.

The foregoing exemplary embodiments and advantages are merely exemplary and are not to be construed as limiting the present inventive concept. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
   a first ancillary memory;
   a second ancillary memory;
   a signal processor configured to process an image signal;
   a main memory configured to store an application program, and information indicating whether the application program is to be loaded into the first ancillary memory or the second ancillary memory when the signal processor is in a non-operational state; and
   a main processor configured to:
      in response to receiving an execution request with respect to the application program while the signal processor is in the non-operational state, load the application program from the main memory to either the first ancillary memory or the second ancillary memory based on the information on the application program stored in the main memory, and execute the application program, and
      in response to the signal processor transitioning from the non-operational state to an operational state while the application program is loaded in the second ancillary memory, copy the loaded application program from the second ancillary memory to the first ancillary memory.

2. The apparatus as claimed in claim 1, further comprising:
   an operating status sensor configured to sense an operating status of the signal processor,
   wherein the main processor determines the operational state of the signal processor based on a sensed result.

3. The apparatus as claimed in claim 1, wherein if the information indicates that the application program is to be loaded into the first ancillary memory when the signal processor is in the non-operational state, the main processor is configured to, in response to receiving an execution request with respect to the application program while the signal processor is in the non-operational state, load the application program to the first ancillary memory, and wherein if the information indicates that the application program is to be loaded into the second ancillary memory when the signal processor is in the non-operational state, the main processor is configured to, in response to receiving an execution request with respect to the application program while the signal processor is in the non-operational state, load the application program to the second ancillary memory.

4. The apparatus as claimed in claim 1, wherein the main processor is further configured to delete the application program loaded in the second ancillary memory in response to the signal processor transitioning from the non-operational state to the operational state.

5. The apparatus as claimed in claim 1, wherein the information comprises attribute information and type information corresponding to the application program, and
wherein in response to the signal processor transitioning from the non-operational state to the operational state, the main processor is configured to copy the application program from the second ancillary memory to the first ancillary memory based on the type information.

6. The apparatus as claimed in claim 5, wherein the first ancillary memory further stores priority information corresponding to the application program, and
wherein the main processor copies the application program from the second ancillary memory to the first memory based on the priority information in response to a storage space of the first ancillary memory being insufficient for copying the application program.

7. The apparatus as claimed in claim 5, wherein the attribute information comprises information related to a type of an application program necessary for reproducing image content, and
wherein the type information comprises a process and a thread which are specific operations of the application program.

8. The apparatus as claimed in claim 1, further comprising:
a display,
wherein the main processor is further configured to control the display to display a user interface (UI) graphic to receive input from a user to generate the information.

9. The apparatus as claimed in claim 1, wherein the first ancillary memory and the second ancillary memory are physically separated from each other.

10. The apparatus as claimed in claim 1, wherein the main processor is further configured in response to receiving an execution request with respect to the application program while the signal processor is in the operational state, to load the application program to the first ancillary memory regardless of the information, and to execute the loaded application program.

11. A method for processing an image, the method comprising:
in response to receiving an execution request with respect to an application program stored in a main memory while a signal processor for processing an image signal is in a non-operational state, loading the application program from the main memory to either a first ancillary memory or a second ancillary memory based on information indicating whether the application program is to be loaded into the first ancillary memory or the second ancillary memory when a signal processor is in the non-operational state stored in the main memory, and executing the application programs; and
in response to the signal processor transitioning from the non-operational state to an operational state while the application program is loaded in the second ancillary memory, copying the loaded application program from the second ancillary memory to the first ancillary memory.

12. The method as claimed in claim 11, further comprising:
decoding and signal-processing the image signal;
outputting the decoded image signal; and
sensing an operating status of the signal processor; and
determining the operating status of the signal processor based on a sensed result.

13. The method as claimed in claim 11, wherein if the information indicates that the application program is to be loaded into the first ancillary memory when the signal processor is in the non-operational state, the loading comprises loading the application program to the first ancillary memory, and
wherein if the information indicates that the application program is to be loaded into the second ancillary memory when the signal processor is in the non-operational state, the loading comprises loading the application program to the second ancillary memory.

14. The method as claimed in claim 11, further comprising in response to the signal processor transitioning from the non-operational state to the operational state, deleting the application program loaded in the second ancillary memory.

15. The method as claimed in claim 11, wherein the information comprises attribute information and type information corresponding to the application program, and
wherein the copying comprises in response to the signal processor transitioning from the non-operational state to the operational state, copying the application program from the second ancillary memory to the first ancillary memory based on the type information.

16. The method as claimed in claim 15, wherein the first ancillary memory further stores priority information corresponding to the application program, and
wherein the copying comprises copying the application program from the second ancillary memory to the first ancillary memory based on the priority information in response to a storage space of the first ancillary memory being insufficient for copying the application program.

17. The method as claimed in claim 15, wherein the attribute information comprises information related to a type of an application program which is necessary for reproducing image content, and
wherein the type information comprises a process and a thread which are specific operations of the application program.

18. The method as claimed in claim 11, further comprising:
displaying a user interface (UI) graphic to receive input from a user to generate the information.

19. The method as claimed in claim 11, further comprising in response to receiving an execution request with respect to the application program while the signal processor is in the operational state, loading the application program to the first ancillary memory regardless of the information, and executing the loaded application program.

20. A method for processing an image, the method comprising:
determining whether an execution request with respect to an application program stored in a main memory is received;

determining, in response to the execution request being received, an operating status of a signal processor for signal-processing an image signal;

in response to the signal processor being in a non-operational state, loading the application program from the main memory to either a first ancillary memory which operates with a main processor or a second ancillary memory which is dedicated to the signal processor, based on setting information indicating whether the application program is to be loaded into the first ancillary memory or the second ancillary memory when the signal processor is in a non-operational state stored in the main memory, and executing the application program; and in response to the signal processor transitioning from a non-operational state to an operational state while the application program is loaded in the second ancillary memory, copying the loaded application program from the second ancillary memory to the first ancillary memory.

21. The method as claimed in claim 20, wherein if the information indicates that the application program is to be loaded into the first ancillary memory when the signal processor is in a non-operational state, the loading comprises loading the application program to the second ancillary memory.

22. The method as claimed in claim 20, further comprising:

deleting, in response to the signal processor transitioning from a non-operational state to an operational state, the application program loaded in the second ancillary memory.

23. The method as claimed in claim 20, wherein the loading and storing the application program into the first or the second ancillary memory are performed based on attribute information included in the setting information, and wherein the copying comprises copying the application program from the second ancillary memory to the first ancillary memory based on type information included in the setting information.

24. The method as claimed in claim 23, wherein the attribute information comprises information on a type of application program necessary for reproducing image content, and wherein the type information comprises a process and a thread which are specific operations of the application program.

25. The method as claimed in claim 23, wherein the performing the copying comprises copying the application program from the second ancillary memory to the first ancillary memory based on priority information included in the setting information in response to a storage space of the first ancillary memory being insufficient for copying the application program.

26. A non-transitory computer readable recording medium including a program for executing a method for processing an image, the method comprising:

determining whether an execution request with respect to an application program stored in a main memory is received;

determining, in response to the execution request being received, an operating status of a signal processor for signal-processing an image signal;

in response to the signal processor being in a non-operational state, loading the application program from the main memory to either a first ancillary memory which operates with a main processor or a second ancillary memory which is dedicated to the signal processor, based on setting information indicating whether the application program is to be loaded into the first ancillary memory or the second ancillary memory when the signal processor is in a non-operational state stored in the main memory, and executing the application program; and in response to the signal processor transitioning from a non-operational state to an operational state while the application program is loaded in the second ancillary memory, copying the loaded application program from the second ancillary memory to the first ancillary memory.

* * * * *